UNITED STATES PATENT OFFICE.

HENRY KING, OF BALTIMORE, MARYLAND.

IMPROVED BLUE FLUID FOR WRITING.

Specification forming part of Letters Patent No. 1,400½, dated November 9, 1839.

*To all whom it may concern:*

Be it known that I, HENRY KING, of Baltimore, in the county of Baltimore and State of Maryland, have invented a new and Improved Mode of Manufacturing Blue Writing-Fluid; and I do hereby declare the following is a full and exact description.

To enable others skilled in the art to make and use my invention, I will proceed to describe its composition and operation.

First. Take indigo, powdered, two and one-half ounces; sulphuric acid, one pound. Mix them, and stir with a glass rod occasionally until the indigo is dissolved.

Second. Take nut-galls Aleppo, one ounce; alum, three drams; boiling water, one pint. Mix and let stand twenty-four hours, or until the precipitate settles; then filter.

Take mixture first, put it in a glass or stone vessel, add sixteen ounces of water; then gradually add carbonate of lime, four pounds, or a sufficient quantity to neutralize the acid; then add seven pints of water; pour off and filter; then add mixture second, and to each ounce of the fluid add one grain sulphate of iron.

To manufacture the changeable blue writing-fluid, take one gallon of the blue fluid already prepared and add to it mixture No. 2, then to each ounce add nine grains sulphate of iron, and filter.

What I claim as my invention, and desire to secure by Letters Patent, is—

The combination of the ingredients herein specified, so as to form a blue writing-fluid, the same being combined in the manner set forth.

HENRY KING.

Witnesses:
 JOHN S. HARROD,
 DAVID W. B. HARROD.